INVENTOR.
PAUL C. SWARTZ
BY Leon F. Herbert
Robert H. Dilts
ATTORNEYS

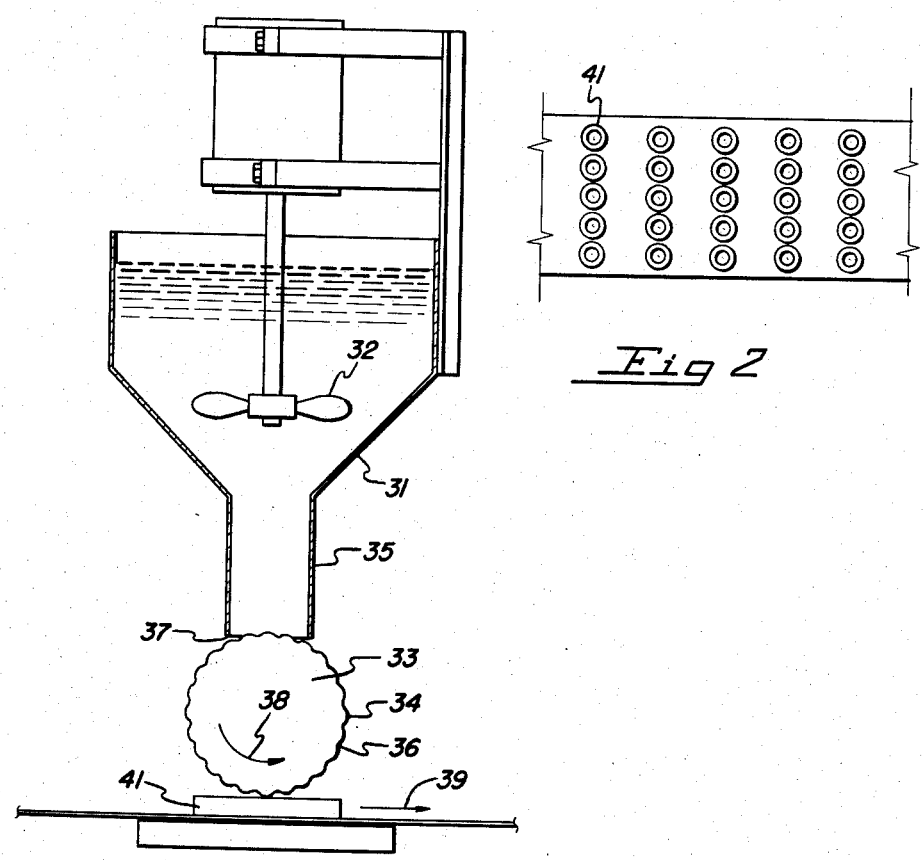
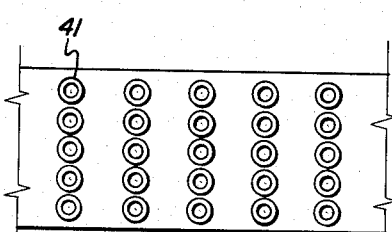
Fig. 2
Fig. 3

United States Patent Office 3,080,846
Patented Mar. 12, 1963

3,080,846
APPARATUS FOR APPLYING A METALLIZING
COATING TO CERAMIC PARTS
Paul C. Swartz, San Carlos, Calif., assignor to Eitel-
McCullough, Inc., San Bruno, Calif., a corporation of
California
Filed Aug. 24, 1959, Ser. No. 835,738
3 Claims. (Cl. 118—66)

This invention relates generally to a coating apparatus and more particularly to an apparatus suitable for applying a metallizing coating to ceramic parts.

It is believed that with the perfection of ceramic to metal sealing techniques, production of many vacuum tubes can be automated. Even where automation is not the primary object, the manufacture of the tubes themselves is greatly simplified by employing ceramic to metal sealing techniques. Particularly, ceramic type vacuum tubes lend themselves more readily to the manufacture of miniature tubes. Evacuation can be carried out at higher temperatures while the tube is being simultaneously out-gassed. Subsequently, the sealing-off operation may be performed by severing a copper tubulation or pressure sealing. In general, no other gettering procedures are necessary.

It is also believed that the mechanical strength and alignment of the various seals and consequently of the internal electrodes is superior to that which can be achieved with conventional metal and glass vacuum tubes.

Generally, ceramic tubes are formed by bonding various ceramic and metal parts together. To provide a good bond between the metal and ceramic parts, a thin metallizing film is first applied to the ceramic body. The ceramic body and film are treated, as for example, by sintering, and the film becomes an integral part of the ceramic.

In the prior art, the application of metallizing dispersions has been manually performed by brushing, silk screening and spraying. Not only is this procedure time consuming and, therefore, expensive, but the uniformity of coating on each part and from one part to another is dependent upon the skill of the worker. In certain instances, non-uniformity of coating in each part may result in a leaky ceramic to metal seal. If the thickness of coatings from one part to the next varies, they may not be suitable for use in automatic machinery. In the conventional methods discussed above, it is relatively difficult to apply a uniform coating having a high density, that is, a coating having a large proportion of metallizing compound to carrier or vehicle.

It is, therefore, a general object of the present invention to provide an apparatus for applying a uniform metallizing dispersion to ceramic parts.

It is another object of the present invention to provide an apparatus suitable for applying a uniform dense coating to ceramic parts.

It is still another object of the present invention to provide an apparatus to apply a consistently uniform coating of the same thickness automatically to a plurality of ceramic parts.

These and other objects of the invention will become more clearly apparent from the following description when taken in conjunction with the accompanying drawing.

Referring to the drawing:

FIGURE 2 is a plan view of a conveyor belt employed in the apparatus of FIGURE 1 showing the ceramic parts; and FIGURE 3 is an enlarged view showing the application of the metallizing mixture to the ceramic part.

Figure 1:
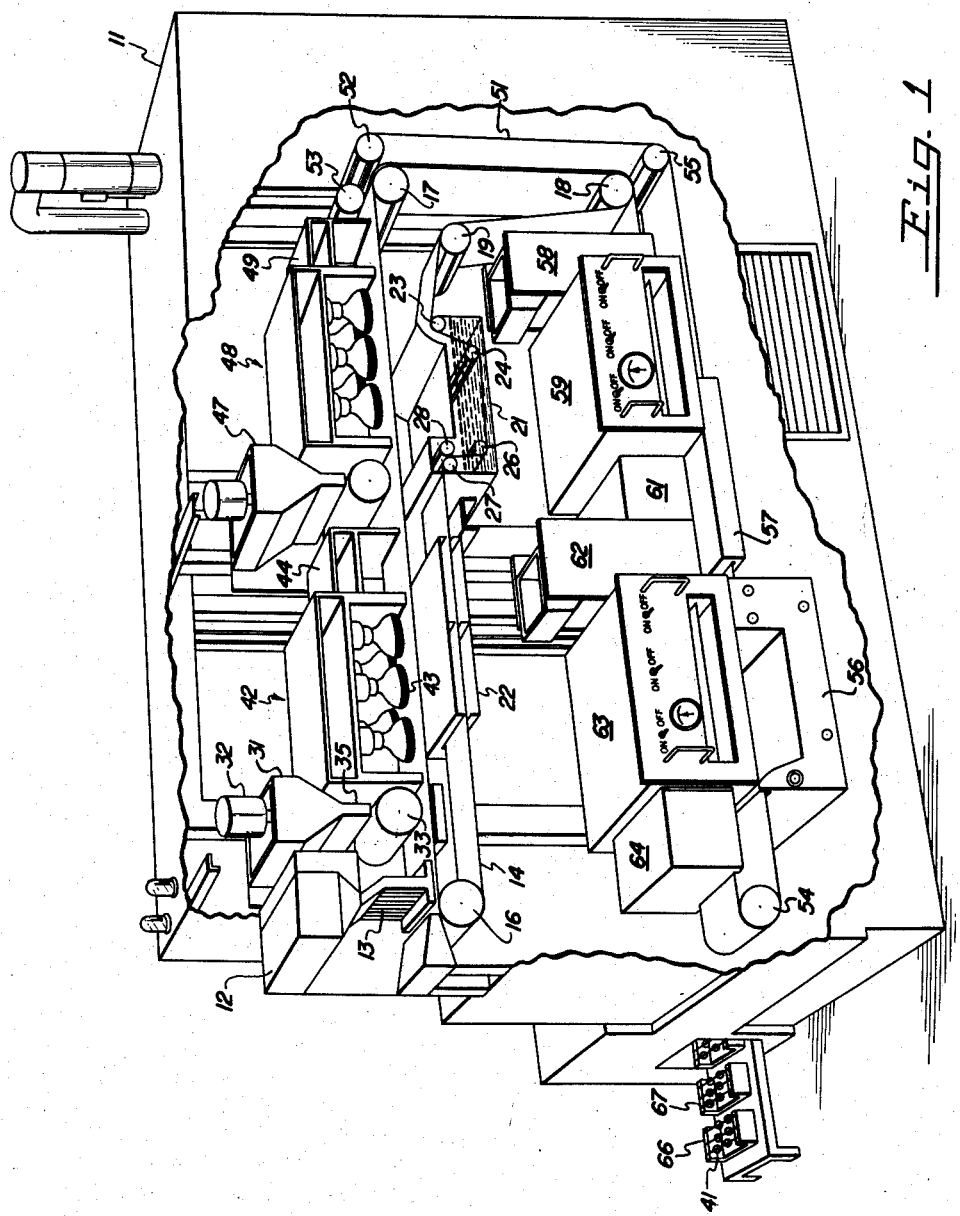
FIGURE 1 is a perspective view showing an apparatus incorporating the present invention.

The apparatus is of the continuous flow type receiving the ceramic parts at one point on a conveyor belt which serves to sequentially move the parts through a plurality of coating, drying and cooling stages, and then deliver the coated parts to a receiving station. Referring to the drawings, the apparatus includes a housing 11 which encloses and supports the working parts. Precleaned ceramic parts, for example, rings, are supplied to a hopper 12 and fed by a suitable feeding mechanism including the chutes 13 onto a conveyor belt 14. The belt 14 travels over rollers 16, 17, 18 and 19 through a bath 21, and through a drying region 22. One or more of the rollers 16, 17, 18 and 19 may be driven. Rollers 23, 24, 26 and 27 guide the belt through the cleaning bath 21 which can incorporate means for brushing the belt or an ultrasonic cleaning means. The roller 28 serves to wring out excess cleaning fluid carried from the bath by the belt.

Referring to FIGURE 2, the loading station may include a feed mechanism for cyclically releasing ceramic parts for application to the belt either singly or in groups. For example, the parts 41 may be released so that they form a plurality of longitudinally spaced transverse rows, FIGURE 2. It is, of course, apparent that any suitable type of feed mechanism may be employed, or, that alternatively, the wafers may be manually placed on the belt by an operator.

The wafers are then moved by the belt to a metallizing station where the metallizing dispersion is applied. The metallizing dispersion is carried in a container 31 and continuously agitated by a suitable agitating means 32 to maintain a uniform dispersion. The dispersion is fed downwardly onto a roller 33 which is machined, knurled, scored or dimpled to form a plurality of dispersion receiving recesses. For example, the recesses may be grooves 36 with adjacent ridges 34, FIGURE 3. The dispersion is fed from the container by the elongated rectangular feed tube 35. The edge 37 acts as a knife tending to scrape the dispersion from the roller as the roller is rotated past the same. The scraping action serves to remove excess material, for example, material disposed above the ridges and leave material in the recesses (grooves). By suitably selecting the overall volume of recesses, any desired amount of material may be delivered during one revolution of the roller. When relatively thick, dense dispersions are to be applied, the roller may be smoothed with the knife edge spaced from the roller an amount corresponding to the layer thickness desired.

The roller is continuously rotated in a counter-clockwise direction as viewed. This is indicated by the arrow 38, FIGURE 3. The belt moves to the right as viewed in the figure. This is designated by the arrow 39. The ceramic part 41 is moved by the belt and passes under the roller. The part is yieldably urged against the roller by the tension in the belt. The metallizing dispersion has a greater affinity for the ceramic part and is, therefore, transferred from the roller 33 onto the ceramic part. The roller and feed tube are adjustably mounted so that application of the dispersion can be controlled. The thickness of the coating or film is dependent upon the amount of material delivered by the roller and clearance between roller receiver during each revolution. In turn, this is controlled by the surface of the roller and position of the knife edge.

The belt then moves the ceramic part through a drying stage designated generally by the reference numeral 42. The dryer may include, for example, a plurality of heat lamps 43 which irradiate the parts as they are moved by the belt. Alternatively electric heating units or a blast of hot air may be employed. After drying, the ceramic parts are moved to a cooling station 44. Cold gases, for example, clean air, are blown over the parts.

If a thicker coating or film is desired, the parts are then moved through a second set of stations 47, 48 and 49, being coated, dried and cooled. The stations are similar to those described above. It is, of course, apparent that, if desired, more stations may be added to apply three coatings, or that less stations may be provided to form a single coating.

When a coating of desired thickness is applied to one surface of the ceramic parts, the parts are pinched between the belt 14 and a second conveyor belt 51. The second conveyor belt travels over rollers 52, 53, 17, 18, 54, and 55. The belt 51 also passes through a suitable cleaning bath shown generally at 56 and a drying region shown generally at 57.

The rings which are pinched between the two belts are held by the yieldable pressure of the belts. The ceramic parts are then released and delivered to and carried by the belt 51. It is observed that the ceramic parts have been turned over to present the opposite surface as well as having been transferred from the belt 14 to the belt 51.

The parts may be transferred from one belt to the other by other means, for example, the parts may drop from the belt 14 into a chute and fall by gravity onto the lower belt 51.

The parts then pass through a coating station 58, a drying station 59, and a cooling station 61 similar to those previously described. Again, if it is desired to apply a second coating, the parts pass through a second coating station 62, a drying station 63, and a cooling station 64.

The parts may then be deposited in a chute (not shown) where they are moved to a loading mechanism (not shown) which loads them onto carriers 66 having a plurality of rods 67 engaging and supporting the metallized ceramic parts 41.

Preferably, the machine is enclosed and pressurized to prevent dust and other materials from collecting on the various parts. For this purpose, suitable blowers may receive filtered air and deliver the same under pressure to the enclosure. Separate blowers may be employed for the various cooling stations. Preferably, movement of the feed roll and the belt is synchronized. This can be achieved by a servo system or by driving both the belt roller and the coating roller from a common source with suitable gearing between the parts. In certain instances, it is desirable to cause the peripheral velocity of the roller to be different than the velocity of the belt. This provides a wiping or scraping action between the ceramic part and the roller. In certain instances, this gives a more uniform metallizing film or coating.

It is apparent that the rollers, drying and cooling chambers, etc. can be made adjustable whereby ceramic parts of different thicknesses can be accommodated.

As previously described, the consistency of the dispersion determines the thickness and texture of the coating which is applied. In general, the mixture can include a binder which is dissolved in a volatile solvent. The binder determines the consistency of the mix and after drying binds the coating together until it is fired. The solvent and binder should be selected to give a good dispersion of the pigment and a good solubility of the binder in the solvent. Preferably, the solvent should be such that it is relatively volatile whereby the coating may be rapidly dried. The binder must be such that a low viscosity, high solid to liquid ratio of pigment can be obtained. The pigment employed may be in the form of a metallic oxide, or may be in the form of a pure metal such as molybdenum metal. By way of example, the following mixtures were found to be suitable for use in machinery of the type described. The ingredients were mixed and pre-rolled, that is, applied to a ball mill and mixed for a period of time indicated and then additional substances applied as indicated, and again rolled to give a total time indicated.

*No. 1*

177 gm. molybdenum
130 ml. of acetonyl acetone
Rolled 18 hours
20 gm. formvar 7/70
Rolled 46 hours total.

*No. 2*

177 gm. molybdenum
110 ml. isophone
Rolled 48 hours
10 gm. formvar 7/70
Rolled 86 hours total.

*No. 3*

177 gm. molybdenum
130 ml. carbitol acetate
Rolled 18 hours
20 gm. nitrocellulose
Rolled 46 hours total.

*No. 4*

236 gm. 20 A manganese dioxide
12 gm. formvar 15/95 E
150 ml. diacetone alcohol.

Thus, it is seen that there is provided an apparatus for automatically coating a plurality of ceramic parts with coatings of uniform, reproducible thickness.

I claim:

1. A metallizing apparatus for applying a metallizing coating to ceramic parts comprising a frame, a conveyor for receiving and transporting the parts, a rotatable coating roller positioned above said conveyor and providing a free travel space for the ceramic parts between the top of said conveyor and the bottom of said roller, said roller having a plurality of recesses and raised portions around its peripheral surface, means for feeding a metallizing dispersion onto both the raised and recessed surfaces of said roller, said raised portions forming baffle walls extending longitudinally of said roller whereby said metallizing dispersion cannot flow freely around the circumference of said roller in the recessed portions thereof, the position of said feeding means and the direction of rotation of said roller being such that the peripheral surface of said roller moves downward as it travels from said feeding means toward said conveyor, and thickness controlling means for said roller, said thickness controlling means having a thickness controlling surface adjacent but spaced from the periphery of said roller, the position of said thickness controlling surface being such that the peripheral surface of the roller moves downward as it travels from said controlling surface toward said conveyor, and the distance between the top of said conveyor and the bottom of said roller being such that the metallizing dispersion carried by said roller will be applied directly from the roller to the top of the ceramic part as it is carried by said conveyor along said free travel space beneath said roller.

2. A metallizing apparatus for metallizing ceramic rings comprising a frame, a first conveyor belt adapted to receive and convey said rings, a first coating roller spaced longitudinally along said belt and therefrom a distance corresponding to the thickness of the ceramic rings, said roller having a plurality of recesses and raised portions around its peripheral surface, first means for applying a metallizing dispersion to both the raised and recessed surfaces on the upper portion of said roller, said raised portions forming baffle walls extending longitudinally of said roller whereby said metallizing dispersion cannot flow freely around the circumference of said roller in the recessed portions thereof, said first conveyor belt serving to move the rings in yieldable contact with said first roller whereby metallizing dispersion is transferred onto the rings, a first drying station along said first conveyor belt and adapted to receive and dry said coated rings, a first cooling station adapted to receive and cool the dried rings, a second conveyor belt, nonmagnetic means for receiving and turning over the ceramic rings and applying them onto said second belt, a second coating roller disposed along said second belt and spaced therefrom a distance corresponding to the thickness of said ceramic rings, said second roller having a plurality of recesses and raised portions around its peripheral surface, second means for applying a metallizing dispersion to both the raised and recessed surfaces on the upper portion of said second roller, said raised portions on the second roller forming baffle walls extending longitudinally of said second roller whereby said metallizing dispersion cannot flow freely around the circumference of said second roller in the recessed portions thereof, said second conveyor belt serving to move the rings in yieldable contact with said second roller whereby metallizing dispersion is transferred onto the other surface of the rings, a second drying station, a second cooling station disposed along said second belt and serving to dry and cool the ceramic rings, and a thickness controlling means for each of said first and second rollers, each of said thickness controlling means having a thickness controlling surface adjacent but spaced from the periphery of its respective roller, the position of each thickness controlling surface being such that the peripheral surface of its respective roller moves downward as it travels from said controlling surface toward the respective conveyor belt.

3. Apparatus as in claim 2 wherein said nonmagnetic means comprises bringing the first and second belts into cooperative relationship for a portion of their length which forms a vertical bight whereby the ceramic rings are pinched between the same and transferred onto the second belt.

References Cited in the file of this patent

UNITED STATES PATENTS

| | | |
|---|---|---|
| 1,311,491 | Briggs | July 29, 1919 |
| 1,352,186 | Flanagan | Sept. 7, 1920 |
| 1,385,000 | Griffing | July 19, 1921 |
| 1,385,492 | Prichard | July 26, 1921 |
| 1,651,939 | Allerton | Dec. 6, 1927 |
| 1,741,698 | Hampson | Dec. 31, 1929 |
| 1,793,082 | Goss | Feb. 17, 1931 |
| 1,832,007 | Eckland et al. | Nov. 17, 1931 |
| 1,979,758 | Merritt | Nov. 6, 1934 |
| 2,130,786 | Bergstein | Sept. 20, 1938 |
| 2,321,082 | Harshberger | June 8, 1943 |
| 2,335,722 | Adams | Nov. 30, 1943 |
| 2,412,138 | Fink | Dec. 3, 1946 |
| 2,438,788 | Palmer | Mar. 30, 1948 |
| 2,439,899 | Monaco | Apr. 20, 1948 |
| 2,451,175 | Risberg | Oct. 12, 1948 |
| 2,531,036 | Goettsch | Nov. 21, 1950 |
| 2,622,555 | Rudolph | Dec. 23, 1952 |
| 2,625,085 | Bergstein | Jan. 13, 1953 |
| 2,659,340 | Zinn | Nov. 17, 1953 |
| 2,689,545 | Nelson | Sept. 21, 1954 |
| 2,729,193 | Scholl | Jan. 3, 1956 |
| 2,787,244 | Hickin | Apr. 2, 1957 |
| 2,838,023 | Jaime | June 10, 1958 |
| 2,843,505 | Riedel | July 15, 1958 |
| 2,889,806 | Conant | June 9, 1959 |
| 2,940,868 | Patchell | June 14, 1960 |